US011142278B2

(12) United States Patent
van Leeuwen

(10) Patent No.: US 11,142,278 B2
(45) Date of Patent: Oct. 12, 2021

(54) TOW ARM ASSEMBLY TO DETACHABLY ATTACH A TRAILER TO A BICYCLE

(71) Applicant: Matthijs van Leeuwen, Burien, WA (US)

(72) Inventor: Matthijs van Leeuwen, Burien, WA (US)

( * ) Notice: Subject to any disclaimer, the term of this patent is extended or adjusted under 35 U.S.C. 154(b) by 0 days.

(21) Appl. No.: 16/120,241

(22) Filed: Sep. 1, 2018

(65) Prior Publication Data

US 2018/0370590 A1  Dec. 27, 2018

(51) Int. Cl.
*B62K 27/12* (2006.01)
*B62J 7/04* (2006.01)

(52) U.S. Cl.
CPC .................. *B62K 27/12* (2013.01); *B62J 7/04* (2013.01)

(58) Field of Classification Search
CPC .............................. B62K 27/02; B62K 27/003
See application file for complete search history.

(56) References Cited

U.S. PATENT DOCUMENTS

| 2,750,206 A * | 6/1956 | Sabato | B62K 27/003 280/204 |
| 3,829,125 A * | 8/1974 | Davis | B62K 27/003 280/204 |
| 3,909,042 A * | 9/1975 | Miller | B62K 27/003 280/204 |
| 4,756,541 A * | 7/1988 | Albitre | B62K 27/006 280/204 |
| 5,076,600 A * | 12/1991 | Fake | B62K 27/006 280/204 |
| 5,330,217 A * | 7/1994 | McCarthy | B60D 1/00 280/204 |
| 5,695,208 A * | 12/1997 | Baechler | B62B 7/04 280/204 |
| 9,315,206 B2 * | 4/2016 | Fleming | B62K 13/00 |
| 2010/0133784 A1 * | 6/2010 | Shalaby | B62K 27/003 280/482 |
| 2011/0068560 A1 * | 3/2011 | Wilson | B62K 27/12 280/514 |
| 2015/0360745 A1 * | 12/2015 | Irwin | B62J 1/28 188/24.14 |
| 2016/0144880 A1 * | 5/2016 | Hansen | B62B 9/20 280/648 |
| 2016/0280112 A1 * | 9/2016 | Jarvis | B62D 63/064 |

FOREIGN PATENT DOCUMENTS

WO   WO-2014137028 A1 *   9/2014   ............. B62K 27/14

* cited by examiner

*Primary Examiner* — Kevin Hurley

(57) ABSTRACT

A tow bar assembly detachably attaches a trailer to a bicycle. The tow bar assembly has a first end having a bicycle hitch adapted to detachably attach to a bicycle, a second end having a swiveling mechanism and a connection member adapted to connect to a trailer, and an intermediate portion connecting the first end to the second end. The swiveling mechanism allows the connection member to rotate relative to a non-rotatable portion of the second end, the rotation being about a second end axis that extends in the forward direction. The swiveling mechanism limits rotation to 10 degrees. When detached from the bicycle the first end can be grasped by a user so the trailer can be used as a cart.

20 Claims, 7 Drawing Sheets

TOW ARM ASSEMBLY TO DETACHABLY ATTACH A TRAILER TO A BICYCLE

TECHNICAL FIELD

The present disclosure relates to the field of a bicycle hitch, and more particularly the present invention relates to a tow arm assembly having a bicycle hitch to detachably attach a trailer to a bicycle to carry loads.

BACKGROUND

Currently, bicycle hitches are predominantly connected to the rear axle of the bicycle. The issue with connecting the bicycle hitches to the rear axle is that heavyweight from the trailer load is unduly exposed directly to one side of the rear axle, while the current axles very often include mechanism for shifting gears or even more current mechanism for electric drivetrains. Some trailers connect to the seat post right under the saddle, which makes the vibration of the road from the trailer being transferred to the saddle. Both of the above-mentioned current methods do not provide optimal solutions for connecting trailers to the bicycles.

Another problem with the current bicycle hitches that are connected to the axles is that they often connect to the side of the trailer, making the trailer unstable. Bicycle trailers that have loads that can move, like a pet or animal, impact the trailer stability. Even if the bicycle hitches connect to the center of the trailer, there is still no optimal stability. As the trailer is generally used to transport loads from one location to another and is being used or stored at another location, most trailers cannot be used as a cart or having difficulty turning into a cart. Once the trailer can be converted into a cart, they need space to make turns and are hard to use in places like grocery stores with narrow aisles.

Therefore, there is a need for a tow arm with a bicycle hitch to detachably attach a trailer to a bicycle to carry loads. Further, there is also a need for a tow arm with a bicycle hitch that will help ensure the stability of a bicycle trailer. Furthermore, there is also a need for a tow arm that can allow a trailer to be converted into a cart after detachment from a bicycle.

Thus, in view of the above, there is a long-felt need in the industry to address the aforementioned deficiencies and inadequacies.

Further limitations and disadvantages of conventional and traditional approaches will become apparent to one of skill in the art through comparison of described methods and apparatuses with some aspects of the present disclosure, as set forth in the remainder of the present application and with reference to the drawings.

SUMMARY OF THE INVENTION

The present invention solves the technical problems of the prior art. In response to these problems, the present invention provides a tow arm assembly that utilizes a bicycle hitch to detachably attach a bicycle with a trailer to carry loads, as shown in and/or described in connection with at least one of the figures, as set forth more completely in the claims.

The present apparatus comprises a tow arm assembly comprising a bicycle hitch. The tow arm assembly is attachable to a bicycle rack either connected to the seat tube of a bicycle or a rear rack of the bicycle to detachably attach the bicycle with a trailer to carry one or more loads. The tow arm assembly utilizes a limited swiveling mechanism to support a plurality of dynamics of the bicycle without disrupting the dynamics of the bicycle. The tow arm assembly connects with the center of the trailer to block a lateral movement of the trailer and the bicycle at up to 10 degrees by utilizing a swiveling mechanism. The swiveling mechanism prevents the trailer having a plurality of wheels from tipping and sustains the dynamics of the bicycle in the lateral movement.

The rolling kickstand comprises a braking mechanism to park the trailer on a horizontal surface and ride the trailer as a cart. The trailer, on detachment from the bicycle, transforms into a cart and enables a user to hold a distal end of the tow arm assembly to utilize the detached trailer as a cart and the user can further roll the cart using the rolling kickstand.

In an aspect, the apparatus comprises a height adjusting mechanism to adjust the height of the trailer against the horizontal surface.

Accordingly, one advantage of the present invention is that it concentrates the weight of the trailer load on the center of the bicycle without disrupting the axle mechanism or transmitting vibration to the saddle.

Accordingly, one advantage of the present invention is that it provides optimal stability to the trailer.

Accordingly, one advantage of the present invention is that it enables the user to transform the trailers agilely turns into a cart by twisting the tow arm which requires minimal space to push around.

These features and advantages of the present disclosure may be appreciated by reviewing the following description of the present disclosure, along with the accompanying figures wherein like reference numerals refer to like parts.

BRIEF DESCRIPTION OF DRAWINGS

The accompanying drawings illustrate the embodiments of apparatus, methods, and other aspects of the disclosure. Any person with ordinary skill in the art will appreciate that the illustrated element boundaries (e.g., boxes, groups of boxes, or other shapes) in the figures represent an example of the boundaries. In some examples, one element may be designed as multiple elements, or multiple elements may be designed as one element. In some examples, an element shown as an internal component of one element may be implemented as an external component in another and vice versa. Furthermore, the elements may not be drawn to scale.

Various embodiments will hereinafter be described in accordance with the appended drawings, which are provided to illustrate, not limit, the scope, wherein similar designations denote similar elements, and in which:

FIG. 7 illustrates a perspective view of the tow arm assembly of FIG. 1 with a rolling kickstand returned to.

DETAILED DESCRIPTION

The present disclosure is best understood with reference to the detailed figures and description set forth herein.

Various embodiments have been discussed with reference to the figures. However, those skilled in the art will readily appreciate that the detailed descriptions provided herein with respect to the figures are merely for explanatory purposes, as the methods and systems may extend beyond the described embodiments. For instance, the teachings presented and the needs of a particular application may yield multiple alternative and suitable approaches to implement the functionality of any detail described herein. Therefore, any approach may extend beyond certain implementation choices in the following embodiments.

References to "one embodiment," "at least one embodiment," "an embodiment," "one example," "an example," "for example," and so on indicate that the embodiment(s) or example(s) may include a particular feature, structure, characteristic, property, element, or limitation but that not every embodiment or example necessarily include that particular feature, structure, characteristic, property, element, or limitation. Further, repeated use of the phrase "in an embodiment" does not necessarily refer to the same embodiment.

Methods of the present invention may be implemented by performing or completing manually, automatically, or a combination thereof, selected steps or tasks. The term "method" refers to manners, means, techniques and procedures for accomplishing a given task including, but not limited to, those manners, means, techniques, and procedures either known to, or readily developed from known manners, means, techniques and procedures by practitioners of the art to which the invention belongs. The descriptions, examples, methods, and materials presented in the claims and the specification are not to be construed as limiting but rather as illustrative only. Those skilled in the art will envision many other possible variations within the scope of the technology described herein.

Figure 1:
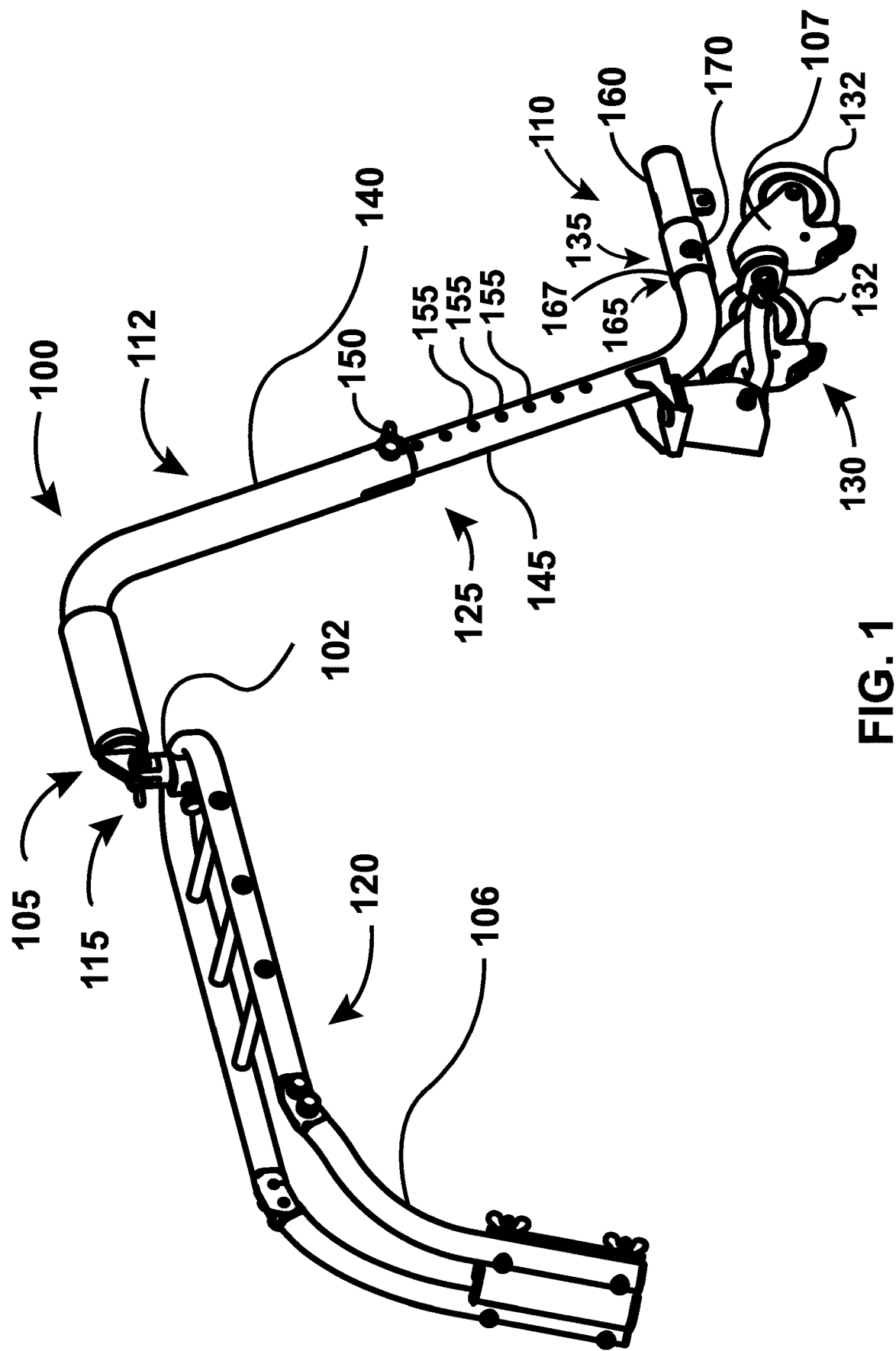
FIG. 1 illustrates a perspective view of a tow arm assembly having a bicycle hitch in accordance with the present invention.
Figure 2:
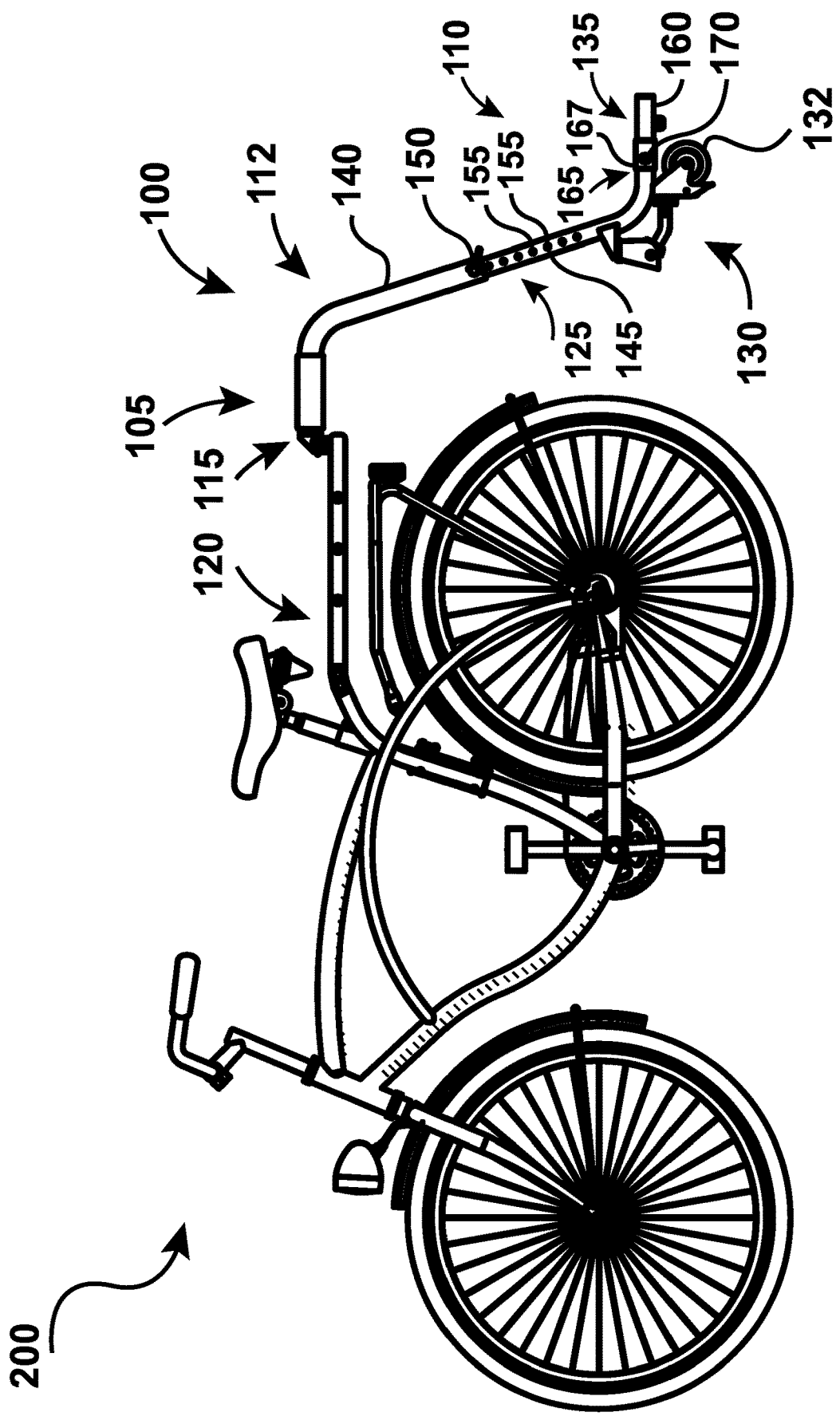
FIG. 2 illustrates a side view of the tow arm assembly of FIG. 1 attached to a bicycle.
Figure 3:
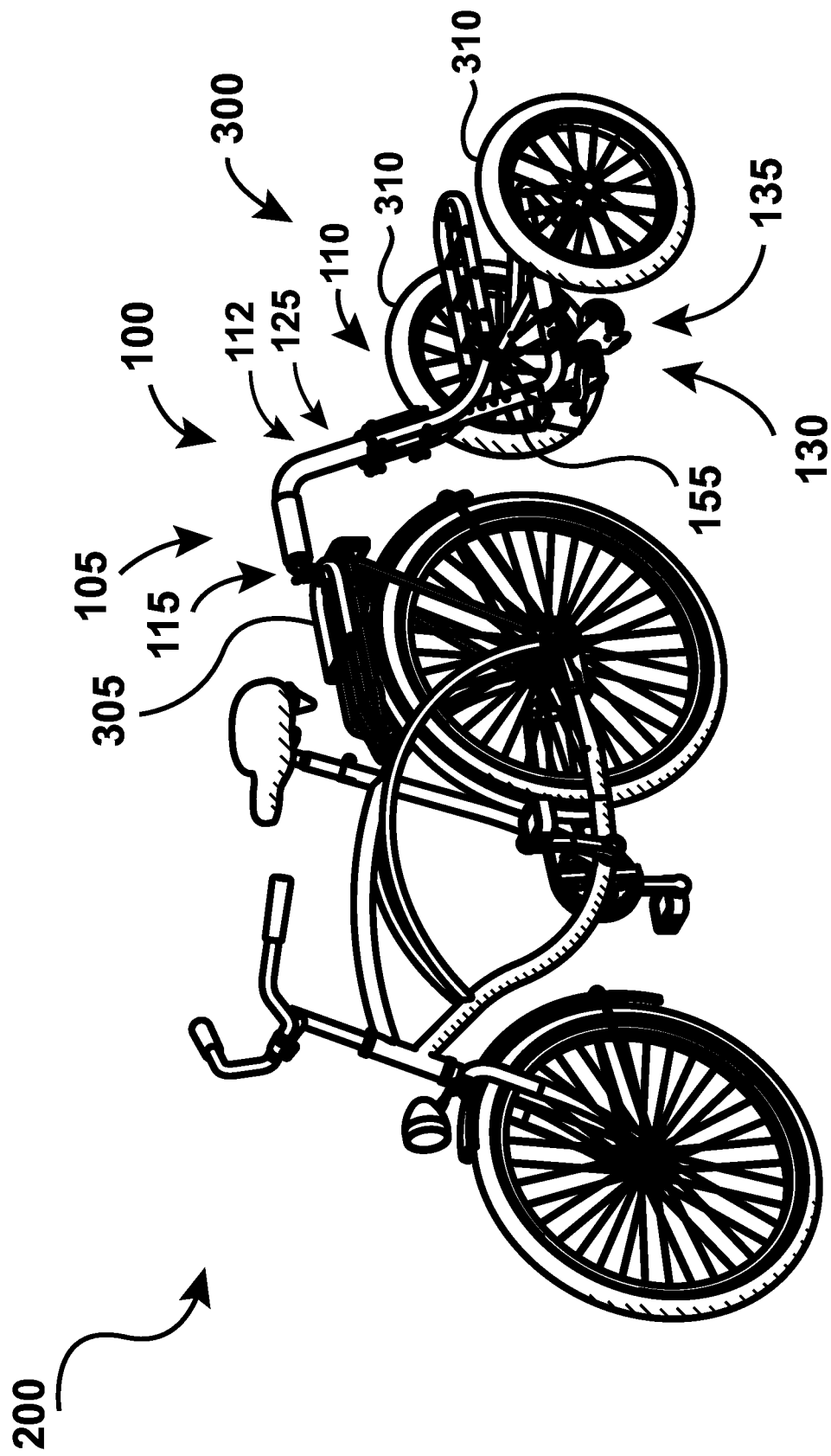
FIG. 3 illustrates a perspective view of the tow arm assembly of FIG. 1 attached to a bicycle and to a trailer.

FIG. 1 illustrates a tow arm assembly 100 in accordance with one version of the present invention. The tow arm assembly 100 includes a first end 105, a second end 110, and an intermediate portion 112 connecting the first end 105 and the second end 110. The first end includes a bicycle hitch 115 that allows the tow arm assembly 100 to be detachably attached to a bicycle 200, as shown in FIG. 2. In the version of FIG. 1 and FIG. 2, the bicycle hitch 115 is shown as a being attached, such as by being clamped, to a seat tube 120 that is universally attachable to a bicycle 200. Alternatively, as shown in FIG. 3, the bicycle hitch 115 can be attached to another part of the bicycle 200. The second end 110 of the tow arm assembly 100 is connectable to a trailer 300, as shown in FIG. 3 so that the trailer 300 is detachably attachable to the bicycle 200 to carry loads, in accordance with at least one embodiment. The tow arm assembly 100 can also include a height adjusting mechanism 125 at the intermediate portion 112 and a rolling kickstand 130 with wheels 132, as will be discussed. The tow arm assembly 100 includes at its second end 110 a swiveling mechanism 135 (also shown in FIG. 2 and FIG. 4) to support a plurality of dynamics of the bicycle 200 without disrupting the dynamics of the bicycle 200. Typically, an uncontrolled bicycle is laterally unstable when stationary and can be laterally self-stable when moving under the desired conditions or when controlled by a rider.

FIG. 2 illustrates the tow arm assembly 100 attached at the first end 105 to a bicycle 200, in accordance with at least one embodiment. As shown in FIG. 1 and FIG. 2, the height adjustment mechanism 125 is located between the first end 105 of the tow arm assembly 100 and the second end 110 of the tow arm assembly 100 in a manner that allows the height of the second end 110 to be adjusted relative to the first end 105. In this way the height adjustment mechanism 125 allows the trailer 300 to be attached to different height bicycles 200, as can be seen by viewing FIG. 3. As can be seen in FIG. 1 and FIG. 2, the height adjustment mechanism 125 of the tow arm assembly 100 includes a first member 140 associated with the first 105 that slidably receives a second member 145 associated with the second end 110. A pin 150 is receivable within one of a plurality of holes 155 so that the height adjustment mechanism 125 can be adjusted to a selected height. The height adjustment mechanism 125 enables the user to level the trailer 300 (shown in FIG. 3) as per her/his requirement.

Figure 4:
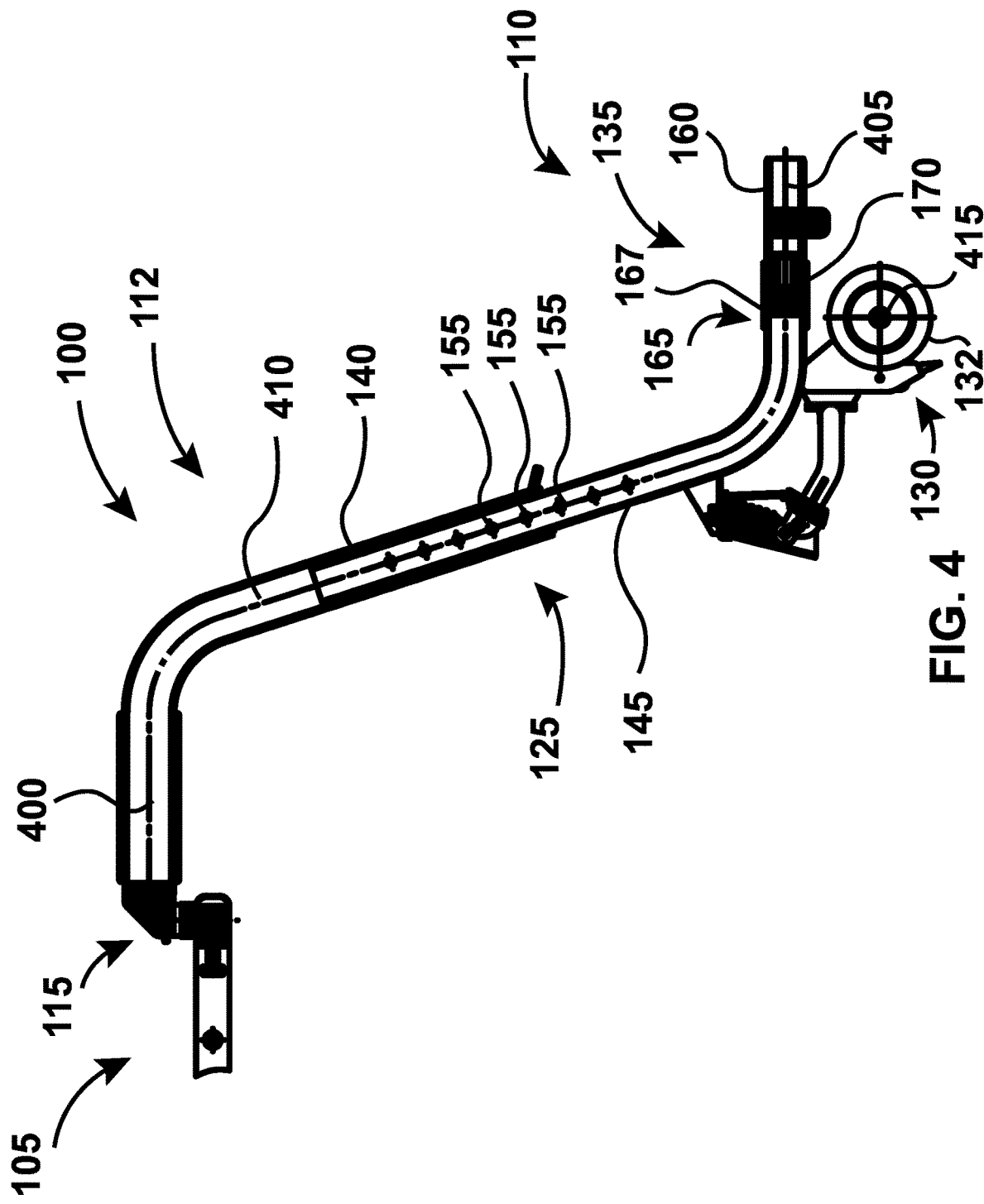
FIG. 4 illustrates a sectional side view of the tow arm assembly of FIG. 1.

FIG. 3 illustrates the tow arm assembly 100 attached at the first end 105 to a bicycle 200 and at the second end 110 to the trailer 300, in accordance with at least one embodiment. In the embodiment of FIG. 3 the first end 105 of the tow arm assembly 100 is integrated with a rear rack 305 of the bicycle 100. The tow arm assembly 100 connects to the center of the trailer 300 in a manner which blocks lateral movement of the trailer 300 relative to the bicycle 200 by allowing the rotation of the trailer 300 relative to the bicycle 200 so that the parts can rotate at up to 10 degrees by utilizing the swiveling mechanism 135 (shown in FIG. 1, FIG. 2 and FIG. 4). FIG. 4 illustrates a sectional cut-through view of the tow arm assembly 100, in accordance with at least one embodiment. As can be seen in FIG. 4, the first end 105 extends along a first end axis 400, the second end extends along a second end axis 405, and the intermediate portion 112 extends along an intermediate axis 410. The first end axis 400 and the second end axis 405 may be generally parallel and extend in generally the forward-rearward direction in relation to the general forward movement of bicycle 200. The second end axis 405 is generally horizontal when the tow bar assembly 100 is connected to the trailer 300 so that the second end axis 405 is generally perpendicular to an axis 415 passing through the center of the wheels 132 of the kickstand 130 when moving forward, the axis 415 also being parallel to an axis 420 about which the wheels 310 of the trailer rotate 300 when the trailer 300 is moving forward. The intermediate axis 410 extends intersects each of the first end axis 400 and the second end axis 405 at an angle so that the intermediate portion 112 can connect the first end 105 to the second end 110. The swiveling mechanism 135 prevents the trailer 300 (shown in FIG. 3) having a plurality of wheels 310 from tipping and sustains the dynamics of the bicycle 200 in the lateral movement. As shown in FIG. 1 and FIG. 4, the swiveling mechanism 135 includes a connection member 160 that is connectable to the trailer 300, the connection member 160 is rotatable within a non-rotating portion 165 of the second end 110 of the tow arm assembly 100. The non-rotating portion 165, which may be in the form of a tube 167, does not rotate relative to the intermediate portion 112. The rotation of the connection member 160 relative to the non-rotating portion 165 is limited by the ends of an elongated slot 170 in the tube 167.

Figure 5:
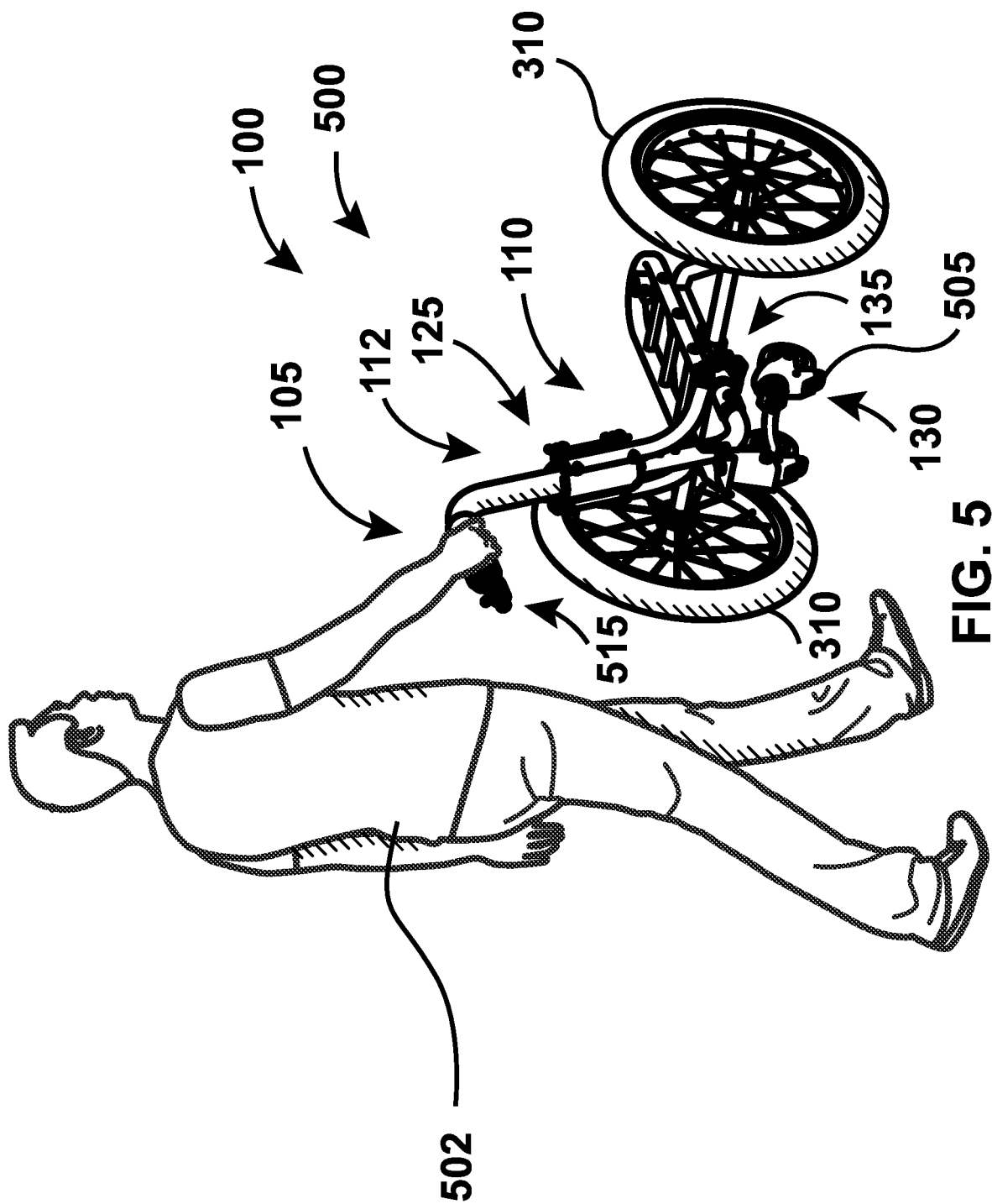
FIG. 5 illustrates a perspective view of the tow arm assembly of FIG. 1 when it transforms the trailer into a cart.
Figure 6:
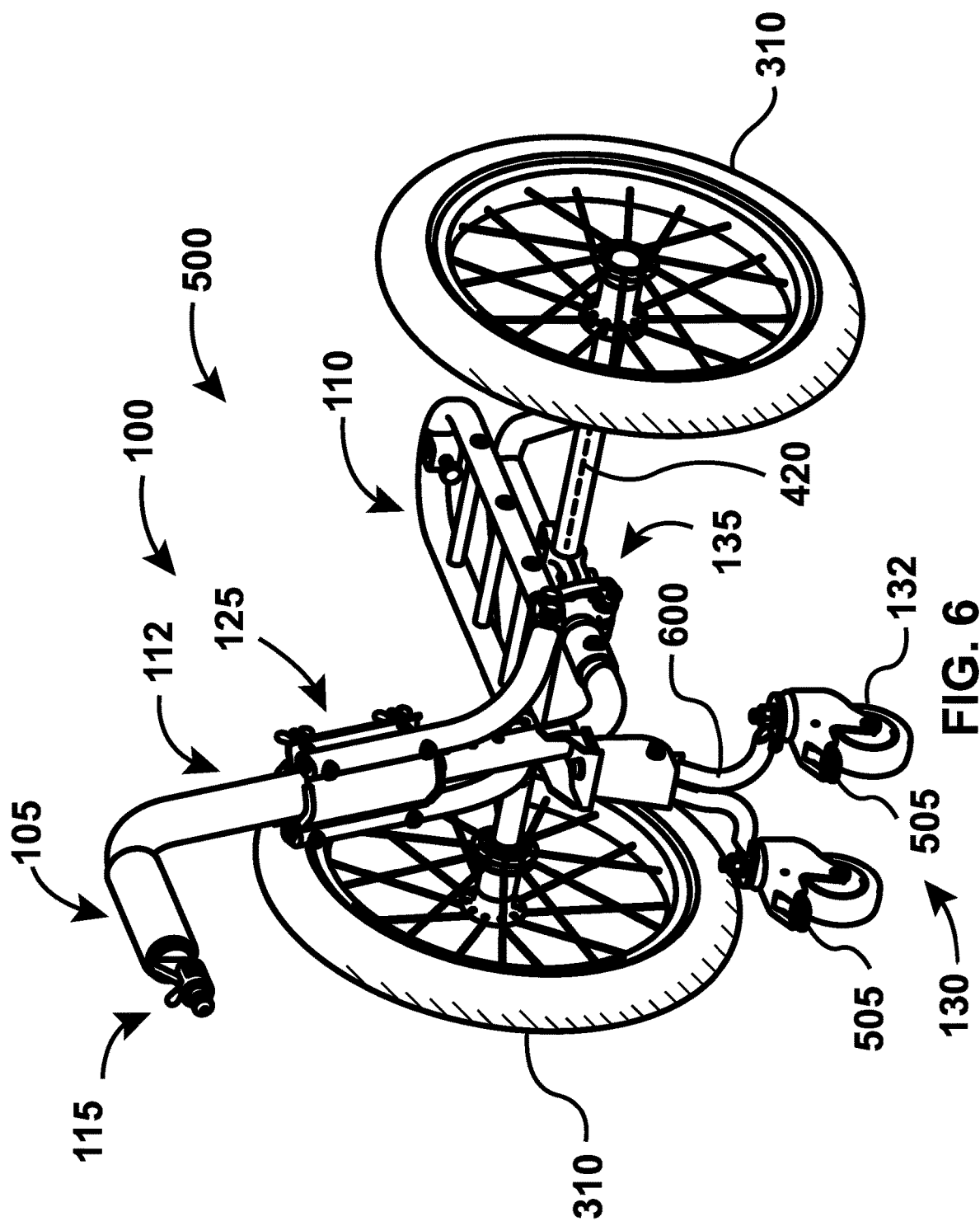
FIG. 6 illustrates a perspective view of the tow arm assembly of FIG. 1 with a rolling kickstand in a downward position.

FIG. 5 illustrates the tow arm assembly 100 and trailer 300 in the form of a cart 500. The first end 105 of the tow arm assembly 100 is detached from the bicycle and the first end 105 may then be grasped by a user, as shown in FIG. 5 while the second end 110 of the tow arm assembly 100 remains connected to the trailer 300, in accordance with at least one embodiment. The rolling kickstand 130 comprises a braking mechanism 505 to park the trailer 300 on a horizontal surface and ride the trailer 300 as a cart (shown in FIG. 3). FIG. 5 illustrates an operational view of the tow arm assembly 100 when it transforms the trailer 300 into a cart 500, in accordance with at least one embodiment. The tow arm assembly 100 and trailer 300, on detachment from the bicycle, transforms into a cart 500 and enables a user 502 to hold the first end 105 of the tow arm assembly 100 104 (shown in FIG. 1) to utilize the detached trailer 300 as a cart 500 and the user 502 can further roll the cart 500 using the rolling kickstand 130. FIG. 6 illustrates an exemplary view of the tow arm assembly and the trailer 300 as a cart when the rolling kickstand 130 is in downward position 600, in accordance with at least one embodiment.

Figure 7:
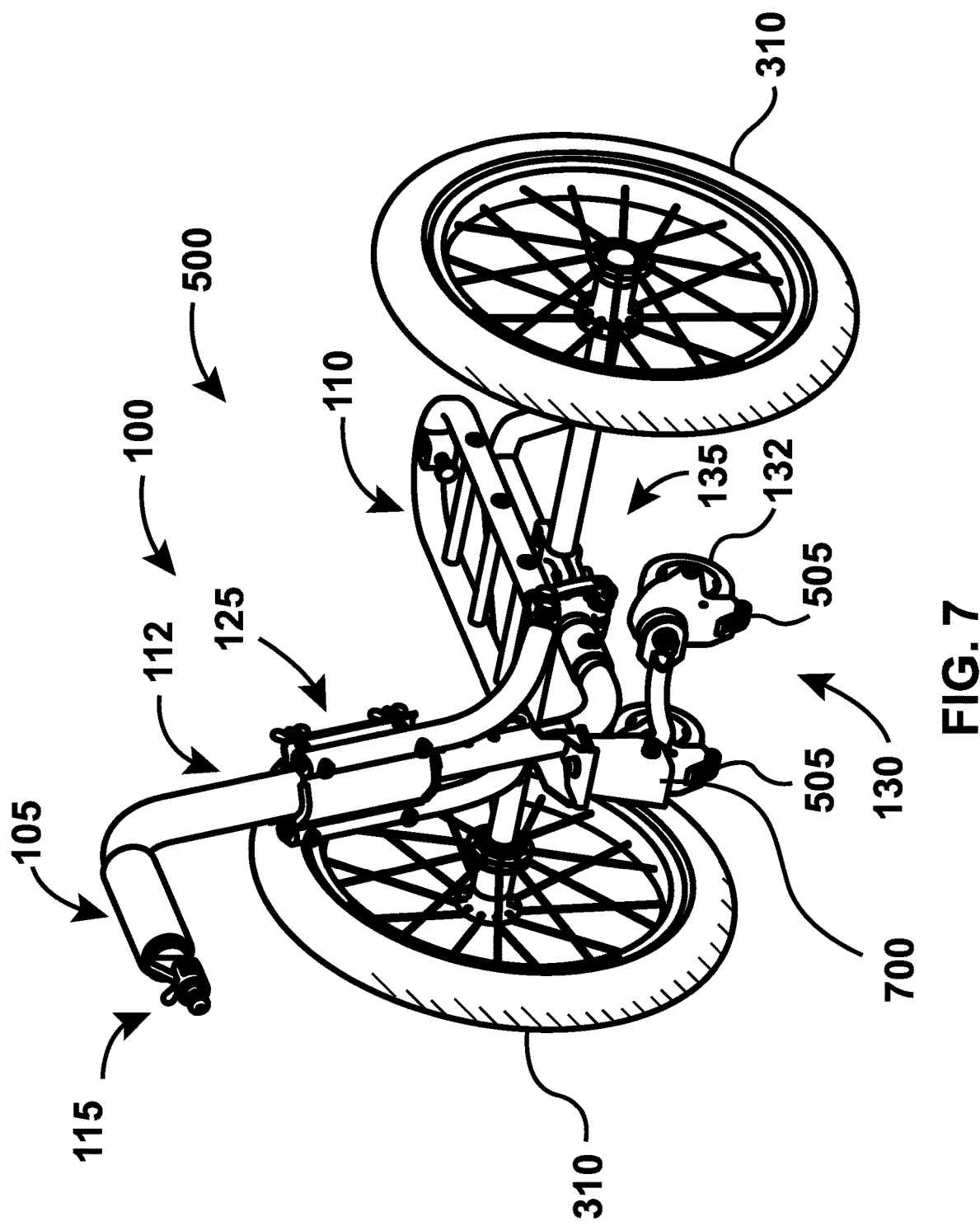

FIG. 7 illustrates an exemplary view of the tow arm assembly 100 and trailer 300 in the form of a cart 500 when the rolling kickstand 130 is moved back to an upward position 700, in accordance with at least one embodiment. Thus, the tow arm assembly 100 provides an apparatus which connects the trailer 300 (shown in FIG. 5) to the bicycle 200 (shown in FIG. 2) by using the hitch 115 (shown in FIG. 1) inside a bicycle rack that is attached to the seat tube 120 (shown in FIG. 1) or attached to a rear rack 305 (shown in FIG. 3). The utilization of the tow arm assembly 100 concentrates the weight of the trailer load on the center of the bicycle 200 without disrupting the axle mechanism or transmitting the vibration to the saddle.

Further, the present apparatus provides optimal stability to the trailer 300. The tow arm assembly 100 connects to the center of the trailer 300 and includes the swiveling mechanism 135 to block the lateral movement at 10 degrees. That allows the rider to make regular bicycle turns and the natural lateral movements with it but prevents the trailer 300 from tipping. Furthermore, the trailer 300 can be transformed into a cart 500 by simply detaching the tow arm assembly 100 from the bicycle 200 and allowing a user 502 to hold the cart 500 at the first end 105 of the tow arm assembly 100. The trailer 300 turns agilely by twisting the tow arm assembly 100 requiring minimal space to push around.

No language in the specification should be construed as indicating any non-claimed element as essential to the practice of the invention.

It will be apparent to those skilled in the art that various modifications and variations can be made to the present invention without departing from the spirit and scope of the invention. There is no intention to limit the invention to the specific form or forms enclosed. On the contrary, the intention is to cover all modifications, alternative constructions, and equivalents falling within the spirit and scope of the invention, as defined in the appended claims. Thus, it is intended that the present invention covers the modifications and variations of this invention, provided they are within the scope of the appended claims and their equivalents.

The invention claimed is:

1. A tow bar assembly to detachably attach a trailer to a bicycle, the tow bar assembly comprising:
   a first end having a bicycle hitch adapted to detachably attach to a bicycle,
   a second end having a swiveling mechanism and a connection member adapted to connect to a trailer, and
   an intermediate portion connecting the first end to the second end,
   wherein the swiveling mechanism allows the connection member to rotate relative to a non-rotatable portion of the second end, the rotation being about a second end axis that extends in the forward direction and wherein the swiveling mechanism limits the rotation to 10 degrees.

2. A tow bar assembly according to claim 1 wherein the swiveling mechanism comprises a tube that receives the connection member.

3. A tow bar assembly according to claim 1 wherein the first end extends along a first end axis that is generally parallel to the second end axis.

4. A tow bar assembly according to claim 1 wherein the intermediate portion extends along an axis that is angled relative to the second end axis.

5. A tow bar assembly according to claim 1 wherein the intermediate portion includes a height adjustment mechanism that allows the height of the second end to be adjusted relative to the first end.

6. A tow bar assembly according to claim 5 wherein the height adjustment mechanism comprises a first member associated with the first end that slidably receives a second member associated with the second end.

7. A tow bar assembly according to claim 6 wherein a pin secures the first member and second member at a desired height.

8. A tow bar assembly to detachably attach a trailer to a bicycle, the tow bar assembly comprising:
   a first end having a bicycle hitch adapted to detachably attach to a bicycle,
   a second end having a swiveling mechanism and a connection member adapted to connect to a trailer, and
   an intermediate portion connecting the first end to the second end,
   wherein the swiveling mechanism allows the connection member to rotate relative to a non-rotatable portion of the second end, the rotation being about a second end axis that extends in the forward direction and wherein the tow bar assembly further comprises a kickstand having a wheel, the kickstand being moveable between an upward position and a downward position, the downward position allowing the tow bar and trailer to be used as a cart.

9. A tow bar assembly according to claim 8 wherein the swiveling mechanism limits the amount of rotation.

10. A tow bar assembly according to claim 8 wherein the swiveling mechanism limits rotation to 10 degrees.

11. A tow bar assembly according to claim 8 wherein the swiveling mechanism comprises a tube that receives the connection member.

12. A tow bar assembly according to claim 8 wherein the first end extends along a first end axis that is generally parallel to the second end axis.

13. A tow bar assembly according to claim 8 wherein the intermediate portion extends along an axis that is angled relative to the second end axis.

14. A tow bar assembly according to claim 8 wherein the intermediate portion includes a height adjustment mechanism that allows the height of the second end to be adjusted relative to the first end.

15. A tow bar assembly according to claim 14 wherein the height adjustment mechanism comprises a first member associated with the first end that slidably receives a second member associated with the second end.

16. A tow bar assembly to detachably attach a trailer to a bicycle, the tow bar assembly comprising:
   a first end having a bicycle hitch adapted to detachably attach to a bicycle,
   a second end having a swiveling mechanism and a connection member connected to a trailer, the trailer having two wheels that rotate about a wheel axis, and
   an intermediate portion connecting the first end to the second end,
   wherein the swiveling mechanism allows the connection member to rotate relative to a non-rotatable portion of the second end, the rotation being about a second end axis that is perpendicular to wheel axis when the trailer is moving in a forward direction and wherein the swiveling mechanism limits the amount of rotation to 10 degrees.

17. A tow bar assembly according to claim 16 wherein the second end axis is horizontal when the trailer is attached to a bicycle and the trailer and bicycle are on a horizontal surface.

18. A tow bar assembly according to claim 16 wherein the first end extends along a first end axis that is generally parallel to the second end axis.

19. A tow bar assembly according to claim 16 wherein the intermediate portion includes a height adjustment mechanism that allows the height of the second end to be adjusted relative to the first end.

20. A tow bar assembly according to claim 16 wherein when detached from the bicycle the first end can be grasped by a user so the trailer can be used as a cart.

\* \* \* \* \*